United States Patent
Ganapathy Achari et al.

(10) Patent No.: US 9,824,193 B2
(45) Date of Patent: Nov. 21, 2017

(54) METHOD FOR USING MOBILE DEVICES WITH VALIDATED USER NETWORK IDENTITY AS PHYSICAL IDENTITY PROOF

(71) Applicant: Aruba Networks, Inc., Sunnyvale, CA (US)

(72) Inventors: Rajesh Kumar Ganapathy Achari, Bangalore (IN); Anoop Kumaran Nair, Bangalore (IN); Venkatesh Ramachandran, Bangalore (IN); Venkatraju Venkatanaranappa, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/445,306

(22) Filed: Jul. 29, 2014

(65) Prior Publication Data

US 2016/0035159 A1   Feb. 4, 2016

(51) Int. Cl.

| | |
|---|---|
| *G07C 9/00* | (2006.01) |
| *G06F 21/00* | (2013.01) |
| *H04L 9/00* | (2006.01) |
| *H04W 12/08* | (2009.01) |
| *G06F 21/34* | (2013.01) |
| *G06Q 20/32* | (2012.01) |
| *G06Q 20/38* | (2012.01) |
| *H04W 4/00* | (2009.01) |

(52) U.S. Cl.
CPC .............. *G06F 21/00* (2013.01); *G06F 21/34* (2013.01); *G06Q 20/3224* (2013.01); *G06Q 20/3821* (2013.01); *G07C 9/00103* (2013.01); *H04L 9/00* (2013.01); *H04W 12/08* (2013.01); *G07C 9/00309* (2013.01); *G07C 2009/00769* (2013.01); *H04W 4/008* (2013.01)

(58) Field of Classification Search
CPC ............ G07C 9/00007; G07C 9/00309; G07C 2009/00769; G07C 9/00571; H04W 84/12
See application file for complete search history.

(56) References Cited

U.S. PATENT DOCUMENTS

| | | | | |
|---|---|---|---|---|
| 2010/0096452 | A1* | 4/2010 | Habraken ............ | G06Q 20/327 235/382 |
| 2012/0280783 | A1* | 11/2012 | Gerhardt ............ | G07C 9/00309 340/5.6 |
| 2012/0313796 | A1* | 12/2012 | Lee .................... | B60R 25/2018 340/989 |

(Continued)

*Primary Examiner* — Nabil Syed
(74) *Attorney, Agent, or Firm* — Hewlett Packard Enterprise Patent Department (57) ABSTRACT

The present disclosure discloses a method and network device for using mobile devices with validated user network identity as physical identity proof. Responsive to successfully authenticating a client device for network access, a system generates a network credential for the client device and transmits the network credential to the client device. Further, the system detects that the client device is within a range of a short range wireless device that is associated with a particular physical action. Consequently, the system validates the network credential that the client device possesses. Based on the network credential, the system determines that the client device has permissions for performing the particular physical action, and causes performance of the particular physical action.

15 Claims, 6 Drawing Sheets

(56) References Cited

U.S. PATENT DOCUMENTS

| | | | |
|---|---|---|---|
| 2014/0002236 A1* | 1/2014 | Pineau | G06F 21/32 340/5.6 |
| 2015/0067792 A1* | 3/2015 | Benoit | H04W 12/04 726/5 |
| 2015/0119019 A1* | 4/2015 | Minichmayr | G07C 9/00571 455/420 |
| 2015/0221152 A1* | 8/2015 | Andersen | G07C 9/00309 340/5.22 |

\* cited by examiner

METHOD FOR USING MOBILE DEVICES WITH VALIDATED USER NETWORK IDENTITY AS PHYSICAL IDENTITY PROOF

FIELD

The present disclosure relates to network security in local area networks. In particular, the present disclosure relates to a method and/or network system for using mobile devices with validated user network identity as physical identity proof.

BACKGROUND

Conventionally, in order to gain physical access to a facility, a person would need to be in procession of a physical identity proof, such as a smart card, RFID token, etc. A smart card generally refers to a pocket-sized card with embedded integrated circuits that can provide identification, authentication, data storage and application processing. Currently, in most organizations, the network identity access control is managed by network access servers, whereas the physical identity is managed by separate smart card management systems.

Nevertheless, with the increased use of personal mobile devices, there is increased need for using personal mobile devices as a form of validated physical identity, which can enable the user to perform actions requiring physical access, such as getting access through secure doors, getting services from a vending machine, etc.

DETAILED DESCRIPTION

In the following description, several specific details are presented to provide a thorough understanding. While the context of the disclosure is directed to network security in local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network security in local area networks. In particular, the present disclosure relates to a method and/or network system for using mobile devices with validated user network identity as physical identity proof.

Embodiments of the present disclosure describe a way to securely use network identity that is validated by network access servers as physical identity proof in the form of a mobile device. Thus, the facilitated mobile device can be used as physical identity proof of the validated user, which can activate physical control systems, e.g., secure doors, vending machines, ride admissions in amusement parks, etc. Moreover, the solution described herein allows for using the same network access control servers that manage network identity to enforce complex policy rules on physical access, and also to revoke the granted physical access when required manually or based on policy.

With the solution provided herein, responsive to successfully authenticating a client device for network access, a system generates a network credential for the client device and transmits the network credential to the client device. Further, the system detects that the client device is within a range of a short range wireless device that is associated with a particular physical action. Consequently, the system transmits a first message, to the client device, that identifies the particular physical action associated with the short range wireless device. The system then receives from the client device including a request for the particular physical action and the network credential. Based on the network credential, the system determines that the client device has permissions for performing the particular physical action, and causes performance of the particular physical action.

According to some embodiments of the present disclosure, responsive to successfully authenticating a client device for network access, the disclosed network device generates a network credential for the client device and transmits the network credential to the client device. The disclosed network device then detects a client device within a range of a short range wireless device that is associated with a particular physical action, and initiates a network authentication procedure for authenticating the client device using the network credential from the client device. Based on the network credential, the disclosed network device determines that the client device has permissions for performing the particular physical action, and causes the performance of the particular physical action.

Network Environment

Figure 1:
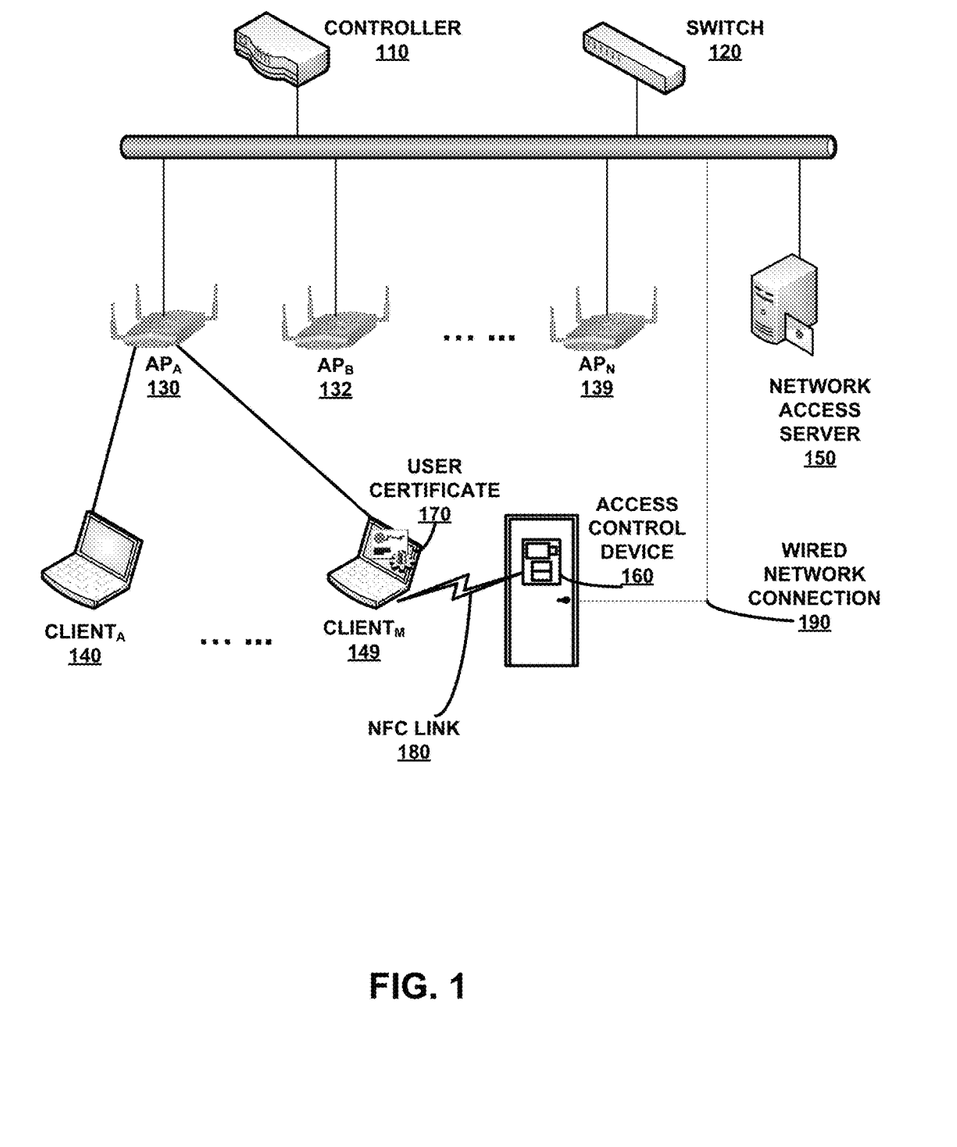
FIG. 1 shows an exemplary network environment according to embodiments of the present disclosure.

FIG. 1 shows an exemplary network environment according to embodiments of the present disclosure. Specifically, FIG. 1 illustrates a network that includes at least a switch 120, a network controller 110, and a plurality of network devices, such as $AP_A$ 130, $AP_B$ 132, . . . , $AP_N$ 139. Furthermore, multiple client devices are associated with each access point. For example, $Client_A$ 140 to $Client_M$ 149 are associated with $AP_A$ 130. The network illustrated in FIG. 1 also includes a network access server 150 and one or more access control devices, such as access control device 160. In some embodiments, access control device 160 is connected to the network via a wired network connection 190. In some embodiments, access control device 160 has no connection to the network, but is capable of communicating via a near field communication (NFC) link 180 or other similar short range wireless communication means with other devices located within the physical proximity of access control device 160.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Switch 120 generally refers to a computer networking device that is used to connect devices together on a computer network by performing a form of packet switching. A switch can send a message only to the port connected to the device that needs or requests the message. A switch is a multi-port network bridge that processes and forwards data at the data link layer (layer-2) of the OSI (Open Systems Interconnection) model. A switch may also have additional features, including the ability to route packets, e.g., as layer-3 or multilayer switches.

Access points, such as $AP_A$ 110, $AP_B$ 112, ..., $AP_N$ 119, generally refer to a wireless network device that allows wireless client devices to connect to a wired network using IEEE 802.11 or related standards. The APs usually connect to a router via a wired network, but can also be an integral component of the router itself.

Each access point serves one or more client devices. Also, each client device and/or access point may connect to another network device and/or client device via a secure communication channel, such as an IPSec tunnel, which passes through a centralized network controller. For example, in FIG. 1, $Client_A$ 140 to $Client_M$ 149 are connected to $AP_A$ 130.

Network access server 150 generally refers to a gateway device to guard access to a protected resource. For example, $Client_M$ 149 connects to network access server 150 and supply to network access server 150 with its network credentials. Network access server 150 then connects to another resource asking whether the network credentials supplied by $Client_M$ 149 are valid. Based on the response, network access server 150 then allows or disallows access to the protected resource by $Client_M$ 149. The protected resource may include any type of physical or network resources, such as access control device 160.

Access control device 160 generally refers to a device to control access to any physical resource, such as a door, a vendor machine, a cabinet, etc. For example, access control device 160 may control physical access by biometric authentication or RFID device authentication within its proximity, etc.

In some embodiments, an onboarding process can provision a unique user certificate 170 in a mobile device, such as $Client_M$ 149. The onboarding process is managed by network access control server 150 in a self-service workflow, which is easy for non-technical users to follow and complete. Onboarding process generally refers to a process that allows for mobile devices to connect to a wireless local area network (WLAN) in a secure manner. The user certificate obtained from the onboarding process allows the mobile device to connect to a Service Set Identifier (SSID) associated with a company's WLAN. Once the mobile device is connected to the WLAN, the mobile device will be able to access any network resources of the WLAN as governed by a set of preconfigured network access control policies. The access control policies generally specify which user certificate has what level of access to various network resources in the WLAN.

During the onboarding process, network access server 150 verifies the user's identity against corporate identity stores. A complex policy decision can be made at this point, if required, to determine whether to allow the user to be authenticated on the mobile device for the purpose of physical identity proof. If the user's identity is validated and the user is authenticated to the WLAN, network access server 150 issues a user certificate 170 that gets installed on mobile device, e.g., $Client_M$ 149.

Currently, once user certificate 170 is issued to mobile device $Client_M$ 149, $Client_M$ 149 can use user certificate 170 to access WLAN network resources. However, user certificate 170 has not been conventionally used to allow mobile device $Client_M$ 149 to access any physical resources controlled by access control device 160. Note that, unlike WLAN network resources, access to physical resources controlled by access control device 160 requires physical proximity between mobile device 200 and access control device 210 to trigger the communication exchanges.

According to embodiments of the present disclosure, user certificate 170 is used also as a physical identity proof to allow the certificate holder, e.g., $Client_M$ 149, access to the physical resource, which is controlled by access control device 160. Two primary components can be used to use the user's validated network identity in the form of unique certificate as physical identity proof. Techniques described herein use a short range low power wireless technology, such as Near Field Communication (NFC). Although only NFC has been mentioned, it can be replaced with any equivalent short range wireless technology capable of detecting and transferring data between two devices upon close proximity, for example, Bluetooth Low Energy (BLE) technology. The first component is an application running on the mobile device, e.g., $Client_M$ 149, which can use the onboarded unique certificate. The application is NFC-enabled and thus can detect an NFC peer's presence and communicate with the NFC peer. The second component is a physical access control device (e.g., access control device 160) which is also NFC-enabled.

According to embodiments of the present disclosure, the onboarded mobile device (e.g., $Client_M$ 149) with the application can be used as physical identity proof to activate the physical access control device (e.g., access control device 160). Note that, the validated user network identity proof (e.g., user certificate 170) can be used to activate the physical access control device 160 irrespective of whether or not the physical access control device 160 has network connectivity.

Also, with techniques disclosed herein, there is no need for creating a separate physical identity proof. For example, a corporate employee would be able to open the door of a lab upon being successfully authenticated into the company's WLAN and performing an action indicating his/her desire to obtain access to the guarded physical resources (e.g., lab door). There is no need for the employee to possess a smart card, RFID token, or another other physical identity proof in order to obtain access to the guarded physical resources.

Moreover, it is important to note that the application on the mobile device may be triggered only when the user of the mobile device performs a specific action, e.g., by bringing the mobile device close to an access pad of access control device 160 in order to be scanned by access control device 160. For example, the application will not be triggered when a user of the mobile device stands in front of a vendor machine trying to decide which beverage to purchase. However, the application will be triggered when the user of the mobile device selects a Coca-Cola™ product on a key pad of access control device 160 and then brings the mobile device close to a scanner of access control device 160.

Using Validated User Network Identity as Physical Identity Proof

A. When Access Control Device has Network Connectivity

Figure 2A:
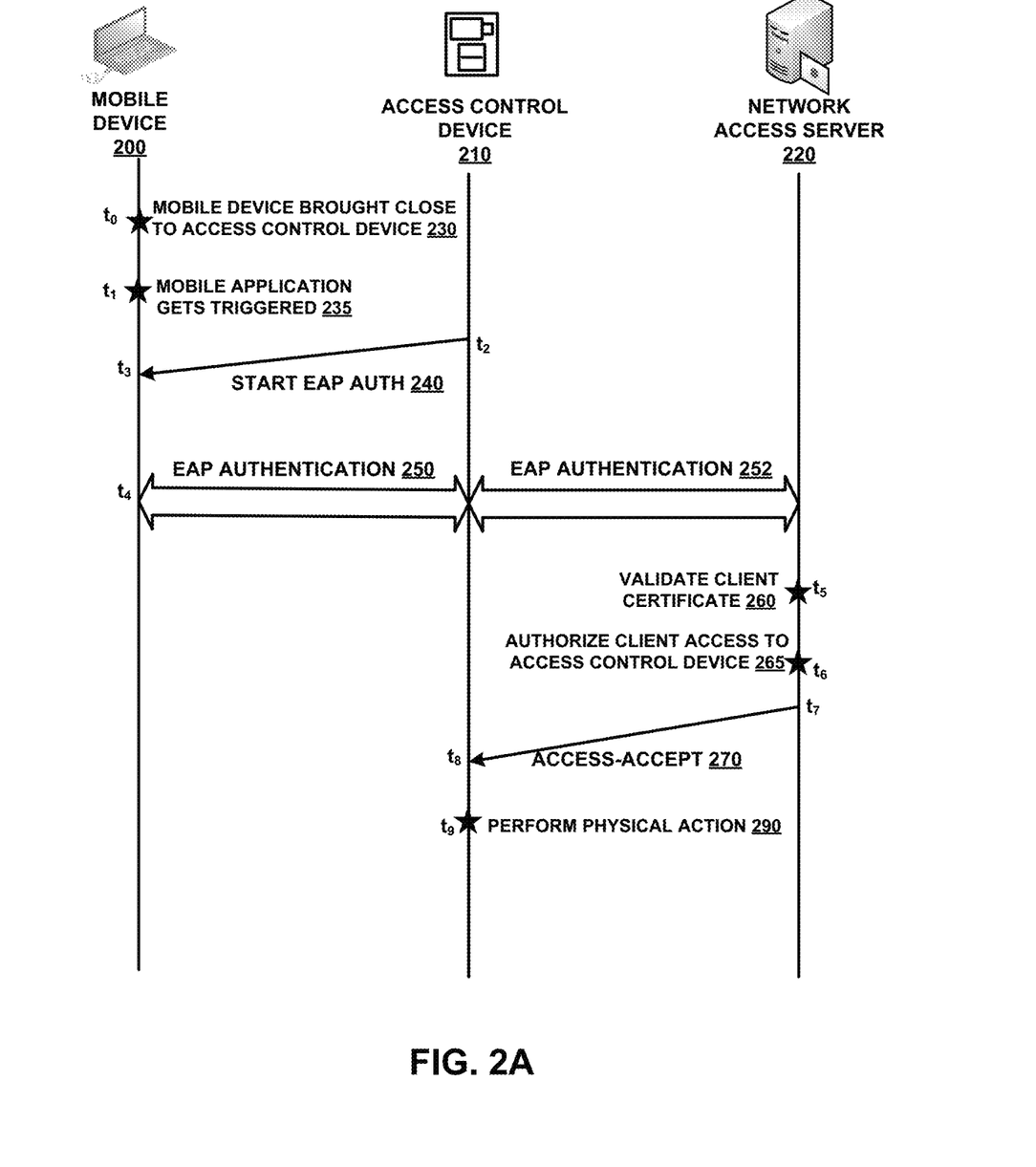
FIGS. 2A-2B show exemplary communication exchanges for using mobile devices with validated user network identity as physical identity proof according to embodiments of the present disclosure.

FIG. 2A illustrates exemplary communication exchanges for using mobile devices with validated user network identity as physical identity proof. FIG. 2A includes at least a mobile device 200, an access control device 210, and a network access server 220. Here, access control device 210 has network connectivity to a local area network, which also includes network access server 220. On the other hand, mobile device 200 may or may not have network connectivity. However, mobile device 200 is capable of communicating with access control device 210 via a near field communication (NFC) link.

Specifically, at time point $t_0$, mobile device 200 is brought near the NFC-enabled access control device 210 (step 230). Furthermore, the application establishes an association with access control device. Thereafter, at time point $t_1$, the mobile application on mobile device 200 gets triggered (step 235). At time point $t_2$, access control device 210 initiates an authentication process, such as Extensible Authentication Protocol (EAP) authentication (step 240). EAP generally refers to an authentication framework providing for the transport and usage of keying material and parameters generated by EAP methods. Note that, EAP only defines message formats, and each protocol that uses EAP defines a way to encapsulate EAP messages within that protocol's messages. Mobile device 200 receives the EAP authentication initiation frame at time point $t_3$.

At time point $t_4$, the EAP network frames will be carried over an NFC link between mobile device 200 and access control device 210. Moreover, the EAP network frames are also transmitted between access control device 210 and network access server 220 over the backhaul network. The communication exchanges between access control device 210 and network access server 220 may be based on a Remote Authentication Dial In User Service (RADIUS) protocol. RADIUS protocol is a networking protocol that provides centralized Authentication, Authorization, and Accounting (AAA) management for users that connect and use a network service. Therefore, mobile device 200 does an EAP authentication (step 250 and step 252) against network access server 220 in a manner by which access control device 210 acts as a pass-through device.

Network access server 220 can store and/or access a set of network access policies as well as a set of physical access policies configured by a network administrator. An exemplary physical access policy is shown below—

If physical access location belongs to group X and client certificate extensions indicate privileges to access group X then allow access.

After access control server 210 receives user certificate from mobile device 200 and passes the user certificate to network access server 220, network access server 220 will determine that the type of authentication that mobile device 200 requested is related to access to a physical resource. This is possible because when the type of authentication that the mobile device 200 requested is related to access to network resources, the request typically includes header information with the Internet Protocol (IP) address corresponding to a network device, such as a switch or a network controller. However, when access control device 210 has network connectivity, the request for access to the physical resource would include the IP address corresponding to access control device 210. Thus, network access server 220 can distinguish the source of the request based on the type of device corresponding to the source IP address in the request frame.

Thereafter, network access server 220 can perform a search among stored physical access policies based on, e.g., the identifier for the physical access control device 210, the time and/or location at which a particular authentication request is made, etc. Note that, network access server 220 could use any kind of policy definitions to determine whether access is to be granted for the particular request.

Access control device 210 does not need to inspect or verify mobile device 210's certificate. Rather, network access server 220 can perform a complex policy evaluation to determine whether to allow mobile device 200 to access the physical entity that access control device 210 is controlling. In this example, at time point $t_5$, network access server 220 validates client certificate supplied by mobile device 200 (step 260).

Network access server 220 can also determine what kind of access is to be granted based on factors, such as, the location of access control device 210, time of the day, and so on. Here, at time point $t_6$, network access server 220 authorizes the user of mobile device 200 access to the physical resource that access control device 210 is controlling (step 265). At time point $t_7$, network access server 220 transmits an access-accept message indicating that access to the physical resource is granted to the user of mobile device 200 (step 270). The access-accept message is received by access control device 210 at time point $t_8$. Subsequently, upon receiving the access-accept message, access control device 210 performs the physical action (step 290), for example, opening a security door, dispensing a merchandise from a vendor machine, etc.

B. When Access Control Device has No Network Connectivity

Figure 2B:
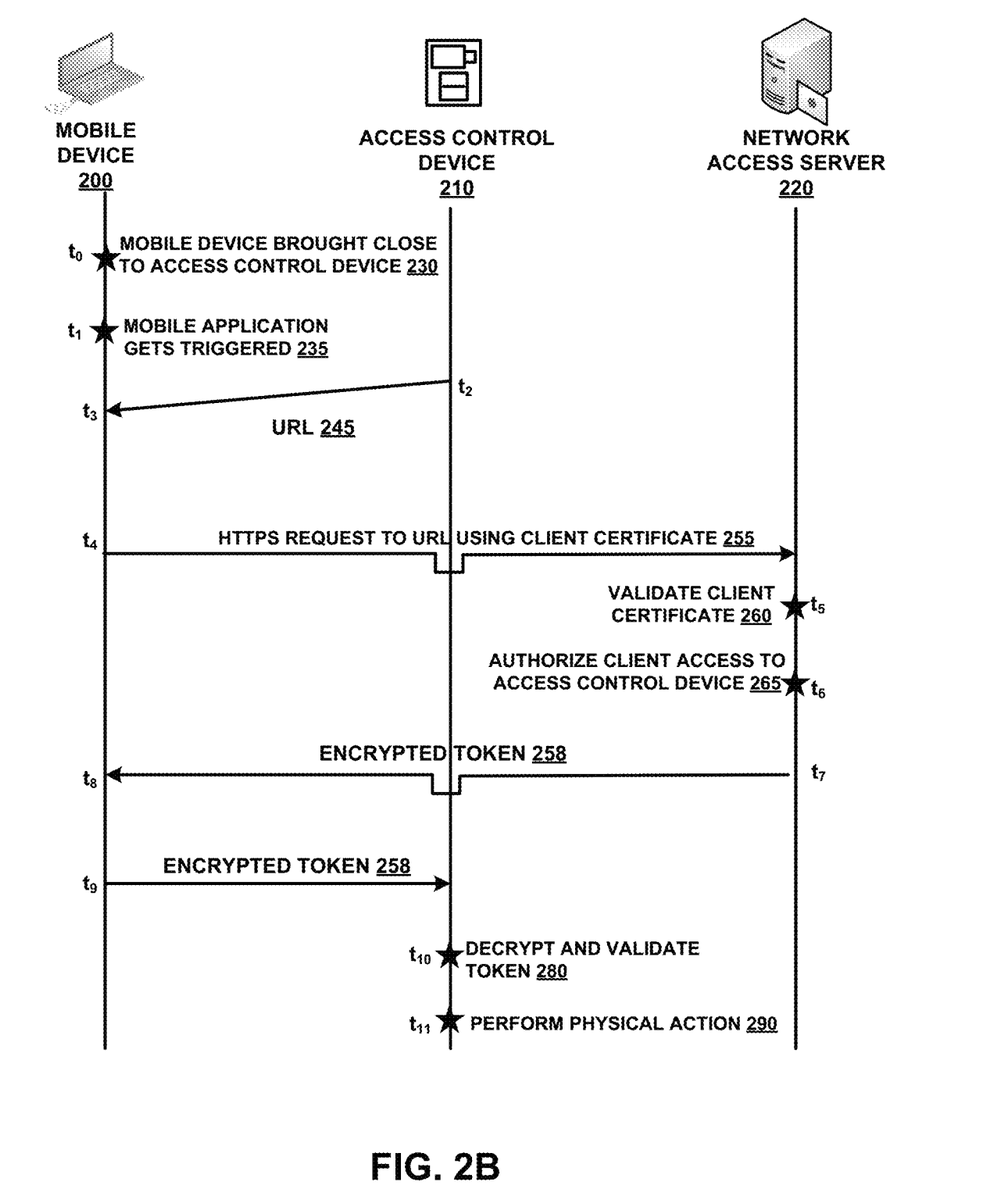

FIG. 2B illustrates exemplary communication exchanges for using mobile devices with validated user network identity as physical identity proof according to embodiments of the present disclosure. FIG. 2B includes at least a mobile device 200, an access control device 210, and a network access server 220. In the example illustrated in FIG. 2B, access control device 210 has no network connectivity, but is capable of communicating via one or more short range wireless communication technologies, such as NFC, BLE, etc., with other devices (e.g., mobile device 200) located within the physical proximity of access control device 210.

Moreover, access control device 210 possesses a pre-established shared secret with network access server 220, such that access control device 210 can decrypt a token that is encrypted by network access server 220 using the pre-established shared secret.

Mobile device 210 has an application installed locally on the device. The application of mobile device 210 is capable of associating with access control device 210 when mobile device 200 is brought within physical proximity of access control device 210 and requests for access using, e.g., NFC communication. For example, at time point $t_0$, mobile device 200 is brought near the NFC-enabled access control device 210 (step 230). Furthermore, the application establishes an association with access control device 210. Thereafter, at time point $t_1$, the mobile application on mobile device 200 gets triggered (step 235).

At time point $t_2$, access control device 210 transmits to mobile device 200 a uniform resource locator (URL) that mobile device 200 can access via Hypertext Transfer Protocol Secure (HTTPS) communication protocol (step 245). The message containing the URL is received by mobile device 200 at time point $t_3$. Moreover, access control device 210 also gives an identifier that identifies physical access control device 210, as well as a randomly generated number as parameters in the HTTPS request. For example, access control device 210 may ask the mobile application of mobile device 200 to authenticate against the following URL:
https://cppm.mydomin.com/
accessctrl?location=564ef23&session=78 96789

Here, location identifier "564ef23" identifies the physical access control device 210, and session identifier "7896789" is a random number that access control device 210 generates for the authentication session for mobile device 200. The access control device may store the randomly generated session identifier for a short expiry period. In some embodiments, the above URL can also be embedded as a custom extension in the onboarded client certificate in which case the physical access control device only needs to give "location" and "session" values to the mobile application.

At time point $t_4$, the pre-installed application on mobile device 200 can then transmit a request to the URL using client certificate (step 255) for the user of mobile device 200 to be authenticated by the network. Note that, mobile device 200 can transmit the HTTPS through any wireless or wired network connections, including but not limited to, a Wi-Fi connection, a 3G/4G Long-Term Evolution (LTE) connection, an Ethernet connection, etc. The mobile application makes an HTTPS connection to the particular URL. The mobile application on mobile device 200 also uses the onboarded certificate as client certificate when establishing the Secure Socket Layer (SSL) session.

At time point $t_5$, network access server 220 validates the client certificate during the establishment of the SSL session (step 260). Thereafter, network access server 220 authorize client access to access control device (step 265) upon validation of client certificate. In addition, network access server 220 can use additional attributes retrieved from identity stores, based on the identity in the client certificate, the attributes of access control device 210 that mobile client 200 is trying to access. For example, network access server 220 can use the location value corresponding to mobile client 200 to identify the location of access control device 210. As another example, network access server 220 can authorize client access to access control device 210 based on the time of day, etc. In some embodiments, network access device 220 may determine various levels or types of access that will be granted to mobile client 200 based on the network user identity supplied by mobile client 200 and other factors, such as location, time of the day, etc.

After successful authorization of client access to access control device 210, network access server 220 creates a token. Specifically, an Advanced Encryption Standard (AES) blob is encrypted using the shared secret between network access server 220 and access control device 210. An exemplary token is shown below.
{session=7896789;location=564ef23;attr1=value1; attr2=value2}
Here, attr1, attr2, etc., are enforcement attributes that determine the kind of access that is to be given to mobile device 200. At time point $t_7$, the above encrypted token 258 is transmitted to the mobile application of mobile device 200 as a response to the HTTPS request upon successful authorization. The encrypted token 258 is received by mobile device 200 at time point $t_8$. In some embodiments, the token can be an opaque blob for the mobile application.

Next, at time point $t_9$, the mobile application of mobile device 200 presents the encrypted token 258 received from network access server 220 to access control device 210. At time point $t_{10}$, access control device 210 decrypts and the encrypted token using the pre-configured shared secret (step 280). Upon successful decryption access control device 210 validates the location value in the token and verifies that the session value has not expired (step 280). Subsequently, at time point $t_{11}$, access control device 210 performs the physical action (step 290). Specifically, access control device 210 accepts the enforcement and grants access to mobile device 200 as defined by the enforcement attributes. Such access may include, but are not limited to, opening a security door, dispensing a merchandise from a vendor machine, etc.

In some embodiments, the physical access granted by way of the onboarded mobile device can be revoked by revoking the user certificate that is issued during the onboarding process. Such a physical access control device 210 can perform a number of functions, for example, managing secured doors access in an enterprise based on policy defined in network access server 220; managing allowed guest's access to vending machines in a stadium, a museum, or other public venues, etc.; managing visitor's access to rides in an amusement park; etc.

Figure 3:
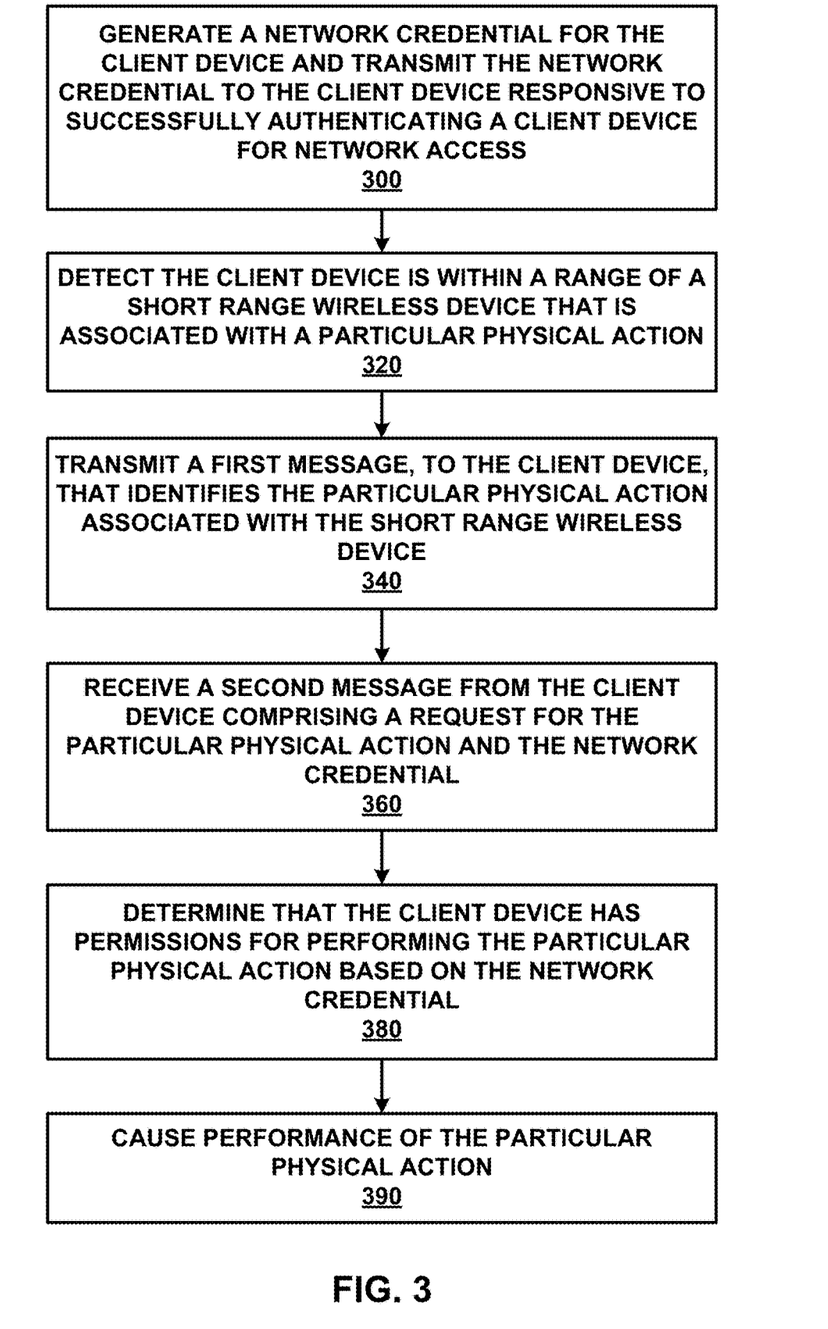
FIG. 3 illustrates an exemplary process for using mobile devices with validated user network identity as physical identity proof according to embodiments of the present disclosure.

Processes for Using Mobile Devices with Validated User Network Identity as Physical Identity Proof FIG. 3 illustrates an exemplary process for using mobile devices with validated user network identity as physical identity proof according to embodiments of the present disclosure. First, a network system generates a network credential for the client device and transmitting the network credential to the client device responsive to successfully authenticating a client device for network access (operation 300). Then, the network system detects that the client device is within a range of a short range wireless device that is associated with a particular physical action (operation 320). Next, the network system transmits a first message, to the client device, that identifies the particular physical action associated with the short range wireless device responsive to detecting the client device (operation 340). Furthermore, the network system receives a second message from the client device comprising a request for the particular physical action and the network credential (operation 360). Based on the network credential, the network system determines that the client device has permissions for performing the particular physical action (operation 380). Subsequently, the network system causes performance of the particular physical action (operation 390).

In some embodiments, the network credential is the same network credential that is provided to the client device after successful authentication for network access.

In some embodiments, the particular physical action is an opening of an entryway for a user of the client device. In some embodiments, the particular physical action is a distribution of a product for use by a user of the client device. In some embodiments, the particular physical action is an admission to a ride in an amusement park. In some embodiments, the particular physical action is an opening of a hotel room by a hotel guest. In some embodiments, the particular physical action is presenting a coupon to a restaurant. In some embodiments, the particular physical action is presenting a smart ticket for frequent travelers of a public transportation system.

In some embodiments, transmitting the first message causes execution of an application on the client device that transmits the second message.

In some embodiments, the network system further identifies the client device based on the network credential, and determines that the client device is authorized for causing performance of the particular physical action. In some embodiments, responsive to determining that the client device has permissions for performing the particular physical action, the network system transmits an authentication token to the client device, whereas the particular physical action is performed by an access control device that receives the authentication token from the client device.

Figure 4:
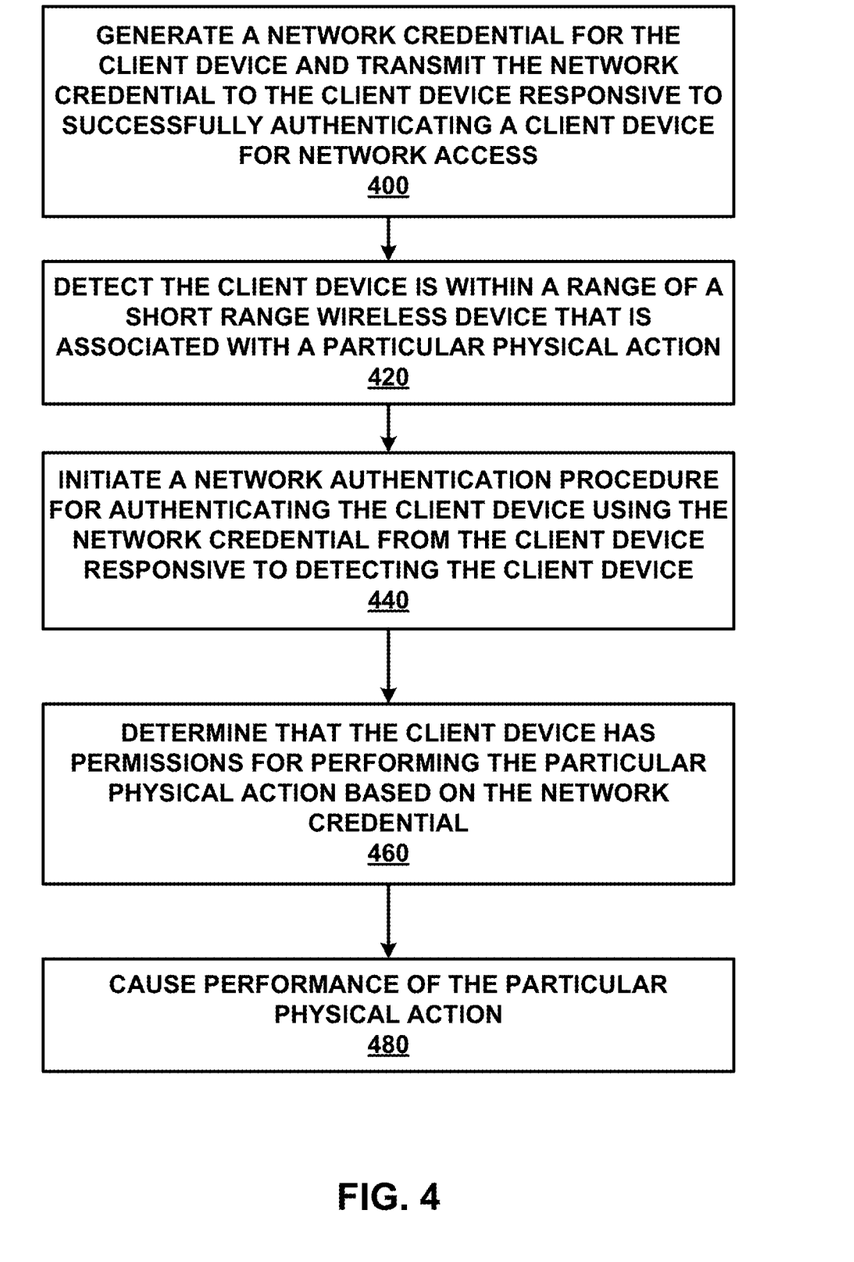
FIG. 4 illustrates another exemplary process for using mobile devices with validated user network identity as physical identity proof according to embodiments of the present disclosure.

FIG. 4 illustrates another exemplary process for using mobile devices with validated user network identity as physical identity proof according to embodiments of the present disclosure. Responsive to successfully authenticating a client device for network access, a network system generates a network credential for the client device and transmits the network credential to the client device (operation 400). Then, the network system detects a client device within a range of a short range wireless device that is associated with a particular physical action (operation 420). Furthermore, responsive to detecting the client device, the network system initiates a network authentication procedure for authenticating the client device using the network credential from the client device (operation 440). Based on the network credential, the network system determines that the client device has permissions for performing the particular physical action (operation 460). Then, the network system causes performance of the particular physical action (operation 480).

In some embodiments, the network system initiates a network authentication procedure by requesting the client device to begin the network authentication procedure.

In some embodiments, the network authentication procedure is an Extensible Authentication Protocol (EAP).

In some embodiments, the particular physical action is performed by an access control device that receives an access-accept message from a network access server.

Figure 5:
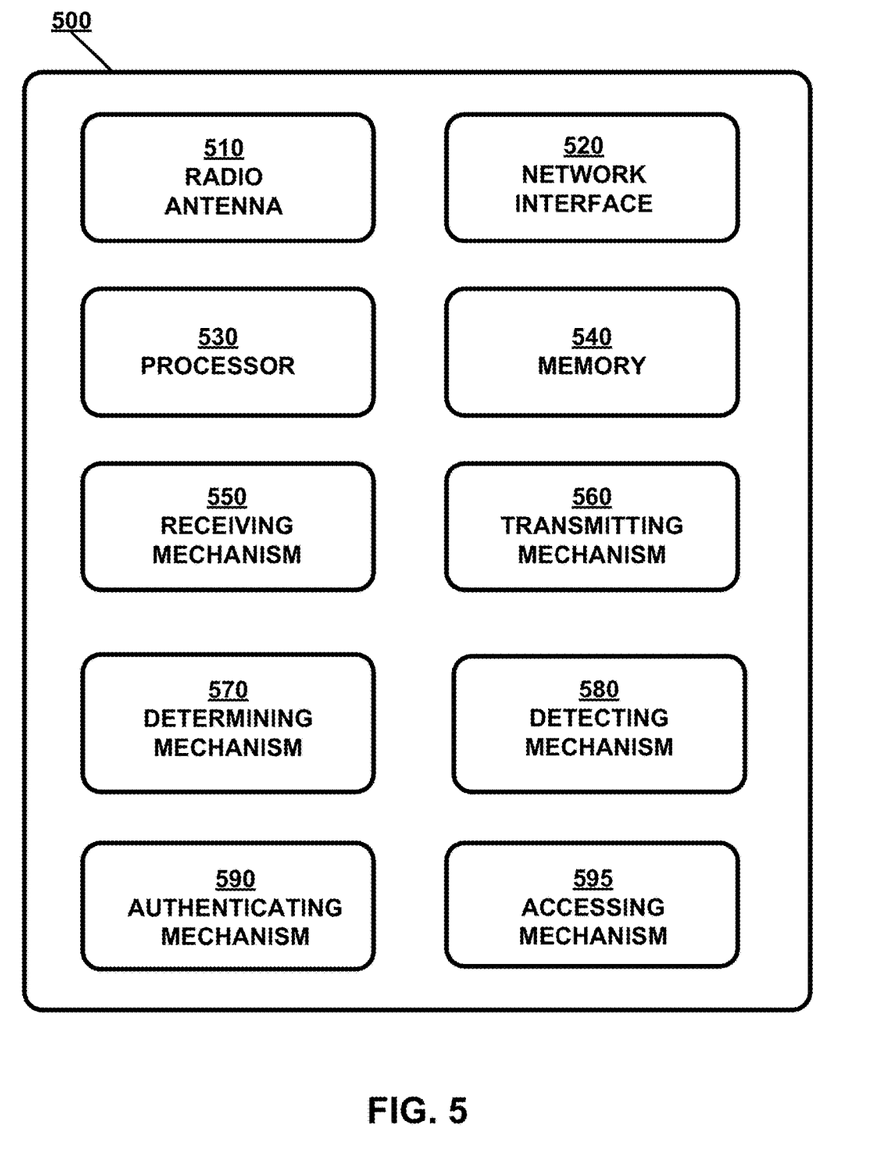
FIG. 5 is a block diagram illustrating an exemplary system for using mobile devices with validated user network identity as physical identity proof according to embodiments of the present disclosure.

System for Using Mobile Devices with Validated User Network Identity as Physical Identity Proof FIG. 5 is a block diagram illustrating a system for using mobile devices with validated user network identity as physical identity proof according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes an receiving mechanism 550, a transmitting mechanism 560, a determining mechanism 570, a detecting mechanism 580, an authenticating mechanism 590, and an accessing mechanism 595, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on. In some embodiments, receiving mechanism 550 receives a message from a client device that includes a request for a particular physical action and a corresponding network credential.

Transmitting mechanism 560 generally transmits messages, which include, but are not limited to, requests and/or responses, beacon frames, management frames, control path frames, and so on.

In some embodiments, responsive to authenticating mechanism 590 as described below successfully authenticating a client device for network access, transmitting mechanism transmits the network credential to the client device.

In some embodiments, responsive to detecting mechanism 580 as described below detecting the client device, transmitting mechanism 560 transmits a message, to the client device, that identifies the particular physical action associated with the short range wireless device. In some embodiments, transmitting the message causes execution of an application on the client device that transmits another message.

In some embodiments, responsive to determining mechanism 570 as described below determining that the client device has permissions for performing the particular physical action, transmitting mechanism 560 transmits an authentication token to the client device. The particular physical action is then performed by an access control device that receives the authentication token from the client device.

Determining mechanism 570 generally determines whether the client device has permissions for performing the particular physical action based on the network credential. In particular, determining mechanism 570 determines that the client device has permissions by identifying the client device based on the network credential, and determining that the client device is authorized for causing performance of the particular physical action.

Detecting mechanism 580 generally detects that a mobile client is within a range of a short range wireless device that is associated with a particular physical action. In some embodiments, the particular physical action is an opening of an entryway for a user of the client device. In some embodiments, the particular physical action is a distribution of a product for use by a user of the client device. In some embodiments, the particular physical action is an admission to a ride in an amusement park. In some embodiments, the particular physical action is an opening of a hotel room by a hotel guest. In some embodiments, the particular physical action is presenting a coupon to a restaurant. In some embodiments, the particular physical action is presenting a smart ticket for frequent travelers of a public transportation system.

Authenticating mechanism 590 generally authenticates a client's access to a network resource or a physical resource based on a network identity proof, e.g., a user certificate, provided by a user of a mobile device. In some embodiments, responsive to successfully authenticating a client device for network access, authenticating mechanism 590 generates a network credential, e.g., a user certificate, for the client device. Note that, the network credential is the same network credential that is provided to the client device after successful authentication for network access. Nevertheless, according to embodiments of the present disclosure, the network credential can be used by a user of the client device for causing a physical action to be performed.

In some embodiments, responsive to detecting the client device, authenticating mechanism 590 initiates a network authentication procedure for authenticating the client device using the network credential from the client device. Specifically, an access control device can request the client device to begin the network authentication procedure. In some embodiments, the network authentication procedure is an Extensible Authentication Protocol (EAP).

Accessing mechanism 595 generally grants access to a physical resource controlled by an access control device to a user of a mobile device. For example, access mechanism 595 can cause performance of a particular physical action. The particular physical action can be, for example, an opening of an entryway for a user of the client device; a distribution of a product for use by a user of the client device; an admission to a ride in an amusement park; an opening of a hotel room for a hotel guest; a coupon a restaurant; a smart ticket for frequent travelers of a public transportation system, etc. In some embodiments, the particular physical action is performed by an access control device that receives an access-accept message from a network access server.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area.

However, the described embodiments may be practiced under subsequent development of the standard within the spirit and scope of the description and appended claims. The description is thus to be regarded as illustrative rather than limiting.

What is claimed is:

1. A system comprising:
a network access control server on a wireless local area network (WLAN), the network access control server to:
verify an identity of a user of a client device including a hardware processor against an identity in an identity store to authenticate the client device;
responsive to successful identification of the client device for network access to the WLAN:
generate a network credential including a user certificate employable by the client device to connect to a service set identifier (SSID) of the WLAN;
transmit the network credential to the client device, wherein transmitting the network credential includes installing the user certificate on the client device;
transmit a first message identifying a particular physical action associated with a short range wireless device to the client device, wherein the short range wireless device is within range of the client device;
receive a second message from the client device comprising a request to perform the particular physical action and the network credential, wherein the network credential includes the user certificate;
based on the network credential, determine that the client device has permissions to perform the particular physical action, wherein the network credential is a same network credential that is provided to the client device after successful authentication for network access; and
transmit a third message to the client device, wherein the third message indicates that the client device is granted access to the particular physical action.

2. The system of claim 1, wherein the particular physical action is an opening of an entryway for a user of the client device.

3. The system of claim 1, wherein the particular physical action is a distribution of a product for use by a user of the client device.

4. The system of claim 1, wherein transmitting the first message causes execution of an application on the client device that transmits the second message.

5. The system of claim 1, wherein determining that the client device has permissions comprises:
identifying the client device based on the network credential; and
determining that the client device is authorized for causing performance of the particular physical action.

6. The system of claim 1, further comprising the system to transmit an authentication token to the client device in response to the determination that the client device has permission to perform the particular physical action, wherein the particular physical action is performed by an access control device that receives the authentication token from the client device.

7. A non-transitory computer readable medium comprising instructions executable by a hardware processor to:
verify an identity of a user of a client device against an identity in an identity store to authenticate the client device;
responsive to successful authentication of the client device for network access to a wireless local area network (WLAN):
generate, at an access control server, a network credential including a user certificate employable by the client device to connect to a service set identifier (SSID) of the WLAN;
transmit the network credential to the client device, wherein transmitting the network credential to the client device includes installing the user certificate on the client device;
authenticate the client device using the network credential including the user certificate from the client device;
based on the network credential, determine that the client device has permissions for performing a particular physical action associated with a short range wireless device, wherein the network credential is a same network credential that is provided to the client device after successful authentication for network access;
transmit a third message to the client device, wherein the third message indicates that the client device is granted access to the particular physical action; and
perform the particular physical action in response to receipt of the third message.

8. The medium of claim 7, wherein the particular physical action is an opening of an entryway for a user of the client device.

9. The medium of claim 7, wherein the particular physical action is a distribution of a product for use by a user of the client device.

10. The medium of claim 7, wherein determining that the client device has permissions comprises:
identifying the client device based on the network credential; and
determining that the client device is authorized for causing performance of the particular physical action.

11. The medium of claim 7, wherein authenticating further comprises initiating a network authentication procedure, and wherein the network authentication procedure comprises an Extensible Authentication Protocol (EAP).

12. The medium of claim 7, wherein the particular physical action is performed by an access control device that receives an access-accept message from a network access control server.

13. A system comprising:
a network access control server on a wireless local area network (WLAN), the network access control server to:
verify an identify of a user of a client device including a hardware processor against an identity in an identity store to authenticate the client device;
responsive to successful identification of a client device for network access, generate a network credential including a user certificate employable by the client device to connect to a service set identifier (SSID) of the WLAN and transmitting the network credential to the client device;
validate the network credentials that are processed by the client device;
based on the network credential including the user certificate, determine that the client device has permissions to perform a particular physical action associated with a short range wireless device, wherein the network credential is a same network credential that is provided to the client device after successful authentication for network access;
transmit a third message to the client device, wherein the third message indicates that the client device is granted access to the particular physical action; and perform the particular physical action in response to receipt of the third message.

14. The system of claim 13, wherein the client device performs the particular physical action.

15. The system of claim 13, wherein:
a network access control device performs the particular physical action; and
the network access control device has no access to the internet.

* * * * *